United States Patent
Gulick, Jr. et al.

(10) Patent No.: US 11,236,853 B2
(45) Date of Patent: Feb. 1, 2022

(54) TOOL-LESS SECURITY APPARATUS

(71) Applicant: Scorpion Security Products, Inc., Vestal, NY (US)

(72) Inventors: Franklyn W. Gulick, Jr., Binghamton, NY (US); Gary R. Page, Chenango Forks, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 63 days.

(21) Appl. No.: 16/800,217

(22) Filed: Feb. 25, 2020

(65) Prior Publication Data

US 2020/0271266 A1  Aug. 27, 2020

Related U.S. Application Data

(60) Provisional application No. 62/809,941, filed on Feb. 25, 2019.

(51) Int. Cl.
  *F16M 11/02*  (2006.01)
  *E05B 73/00*  (2006.01)

(52) U.S. Cl.
  CPC ......... *F16M 11/02* (2013.01); *E05B 73/0082* (2013.01)

(58) Field of Classification Search
  CPC ...... F16M 11/02; E05B 73/0082; E05B 73/00
  USPC .. 248/551, 552, 553, 220.21, 224.7, 220.22, 248/221.11, 222.52, 223.41, 224.8
  See application file for complete search history.

(56) References Cited

U.S. PATENT DOCUMENTS

| | | | | |
|---|---|---|---|---|
| 4,066,231 A * | 1/1978 | Bahner | ................. | B43M 99/00 248/289.11 |
| 4,979,382 A * | 12/1990 | Perry | ................. | E05B 73/0005 248/553 |
| 7,522,047 B2 * | 4/2009 | Belden, Jr. | ................. | A47F 5/12 248/133 |
| 7,614,601 B2 * | 11/2009 | Marsilio | ................. | A47F 7/024 248/178.1 |
| 8,191,851 B2 * | 6/2012 | Crown | ................. | F16M 11/041 248/553 |
| 8,872,660 B2 * | 10/2014 | Yunker | ................ | H03K 17/962 340/571 |
| 9,353,552 B1 * | 5/2016 | Kelsch | ...................... | A47F 5/00 |
| 9,567,776 B2 * | 2/2017 | Moock | ................ | E05B 73/0082 |

(Continued)

*Primary Examiner* — Christopher Garft
*Assistant Examiner* — Michael McDuffie
(74) *Attorney, Agent, or Firm* — Barclay Damon LLP

(57) ABSTRACT

A security apparatus for securely displaying a portable electronic device comprises a base, a holder and a securing portion. The base defines a central bore and comprises a holder engagement portion. The holder comprises an outer surface defining a plurality of vertical channels terminating in a support surface forming a support platform. A holder groove is defined between the support platform and the outer surface of the holder. The securing portion comprises a plurality of projections coupled to each other by one or more lateral braces. Each of the plurality of projections comprises a lateral extension that is configured to contact the support surface and engage a holder groove. Rotation of the securing portion relative to the holder moves each lateral extension of the plurality of projections into the holder channel and secures the securing portion to the holder.

12 Claims, 6 Drawing Sheets

(56) References Cited

U.S. PATENT DOCUMENTS

| | | | | |
|---|---|---|---|---|
| 2012/0120571 A1* | 5/2012 | Bisesti | ............... | H01R 13/5841 |
| | | | | 361/679.01 |
| 2013/0168527 A1* | 7/2013 | Wheeler | ................. | A47F 7/024 |
| | | | | 248/542 |
| 2014/0226298 A1* | 8/2014 | Palmer | ................. | H05K 5/0208 |
| | | | | 361/807 |
| 2014/0265765 A1* | 9/2014 | Khodapanah | .......... | F16M 13/02 |
| | | | | 312/223.1 |
| 2015/0173525 A1* | 6/2015 | Green | .................... | F16M 13/00 |
| | | | | 248/542 |
| 2015/0208826 A1* | 7/2015 | Yang | .................... | A47F 7/0246 |
| | | | | 248/551 |
| 2015/0305518 A1* | 10/2015 | Galant | .................. | F16M 11/06 |
| | | | | 248/551 |
| 2016/0004886 A1* | 1/2016 | Sedon | .................... | A47F 7/024 |
| | | | | 340/568.8 |
| 2018/0347237 A1* | 12/2018 | Tse | ..................... | E05B 73/0082 |
| 2020/0173201 A1* | 6/2020 | Avganim | ............ | E05B 73/0005 |

\* cited by examiner

TOOL-LESS SECURITY APPARATUS

CROSS-REFERENCE TO RELATED APPLICATIONS

Pursuant to relevant portions of 35 U.S.C. § 119 and 37 C.F.R. § 1.53, this application claims the benefit and priority of U.S. Patent Application 62/809,941, filed on Feb. 25, 2019, the entire contents of which is hereby incorporated by reference.

TECHNOLOGICAL FIELD

This invention relates to a detachable security apparatus that is easily locked and unlocked without the use of tools, and which allows for the functional and secure display of portable electronic devices, such as watches.

BACKGROUND

Retailers sell a portable electronic devices such as smart watches that can assist in or perform a multitude of tasks for the a user or customer. Part of the shopping experience for said devices is having the ability to examine and test the electronic device in the retail setting prior to purchase. This is done using floor models that are fitted with some form of security apparatus to prevent theft of the electronic device.

There are many different types of security apparatuses used in retail settings. Some security apparatuses allow the customer to pick up the electronic device while keeping it attached to the security apparatus, which is in turn attached to a display surface. Other security apparatuses comprise a fixed portion that remains coupled to the display surface and a second portion coupled to the electronic device. The second portion acts to tether the portable electronic device to the first portion. These types of security apparatuses allow the customer to freely hold the electronic device while the second portion of the security apparatus remains attached to the electronic device. These types of security apparatuses are not suitable for all types of electronic devices, especially small portable electronic devices, such as smart watches.

In all cases, an employee must use a tool or key to unlock the security apparatus in order to remove the electronic device completely. These keys are proprietary to the particular security apparatus and are frequently lost or even stolen. Consequently, retailers waste money ordering extra keys every year. Other security apparatuses use biometric sensors which allow only certain employees the ability to unlock the security apparatus in order to remove the electronic device. While these devices eliminate the need for a separate key, they also tend to be expensive and may require frequent updates to the biometric database due to employee turnover.

These are just some of the problems associated with current security apparatuses for handheld or portable electronic devices.

SUMMARY

An embodiment of a security apparatus for securely displaying a portable electronic device comprises a base defining a central bore. The base comprises a circumferential rim including a plurality of surface features and one or more anchors extending from a bottom surface of the base. The security apparatus further comprises a holder comprising an outer surface defining a plurality of vertical channels terminating in a support surface. The support surface extends from each of the plurality of vertical channels to a support platform. A holder groove is defined between the support platform and the outer surface of the holder. An inner surface defines a depression and an extension extends from the holder and is configured to be partially positioned within the central bore. The security apparatus further comprises a securing portion comprising a plurality of projections coupled to each other by one or more lateral braces, wherein each of the plurality of projections comprises a lateral extension that is configured to contact the support surface and engage the holder groove. Rotation of the securing portion relative to the holder moves each lateral extension of the plurality of projections into the holder groove and secures the securing portion to the holder. Each support platform is configured to be positioned within one of the plurality of the surface features of the circumferential rim, and the circumferential rim prevents the securing portion from being rotated relative to the holder.

In another embodiment, the security apparatus for securely displaying a portable electronic device comprises a base defining a central bore and comprising a holder engagement portion and one or more anchors extending from a bottom surface of the base. The security apparatus further comprises a holder comprising an outer surface defining a plurality of vertical channels terminating in a support surface. The support surface extends from each of the plurality of vertical channels to form a support platform. A holder groove is defined between the support platform and the outer surface of the holder. An inner surface of the holder defines a depression and an extension extends from the holder and is configured to be partially positioned within the central bore. The security apparatus further comprises a securing portion comprising a plurality of projections coupled to each other by one or more lateral braces. Each of the plurality of projections comprises a lateral extension that is configured to contact the support surface and engage a holder groove. Rotation of the securing portion relative to the holder moves each lateral extension of the plurality of projections into the holder channel and secures the securing portion to the holder.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

Figure 1:
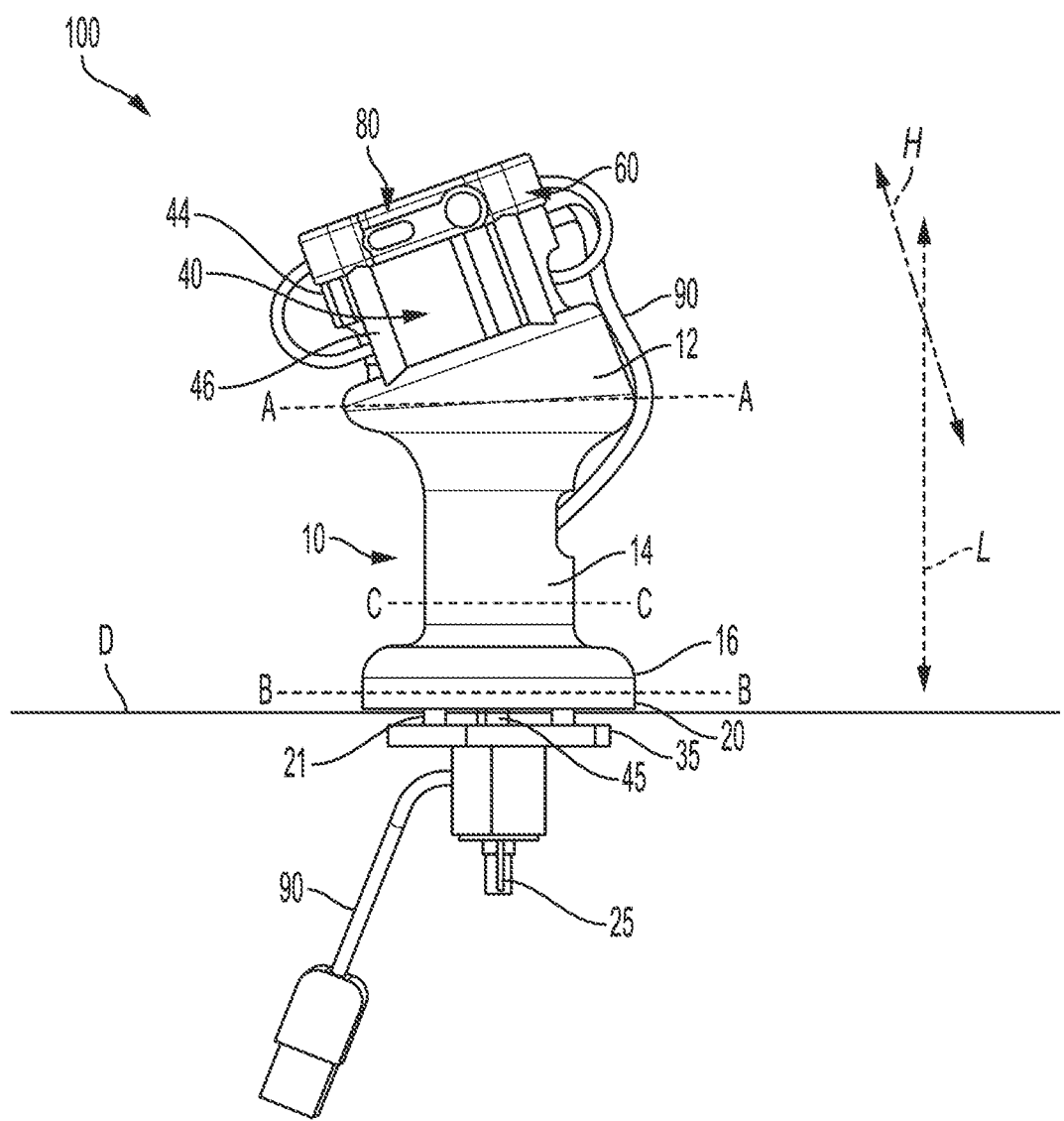
FIG. 1 illustrates a side elevation view of an embodiment of a tool-less security apparatus in an assembled position.
Figure 2:
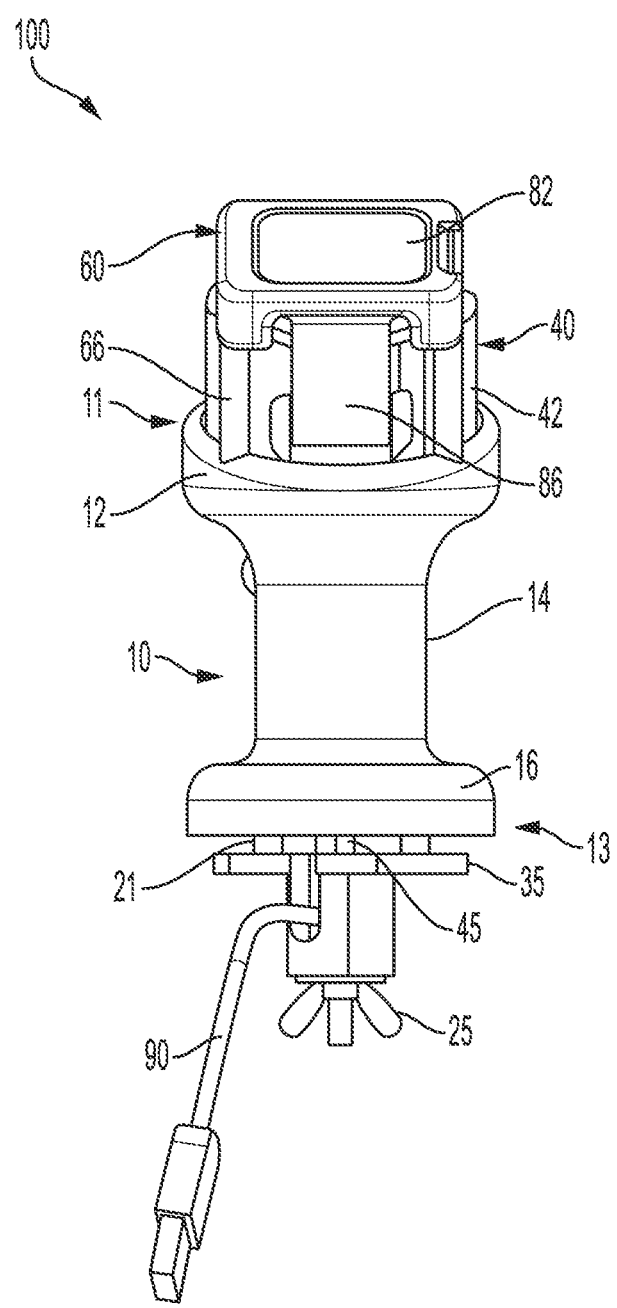
FIG. 2 illustrates a front plan view of the embodiment of the tool-less security apparatus of FIG. 1.
Figure 3:
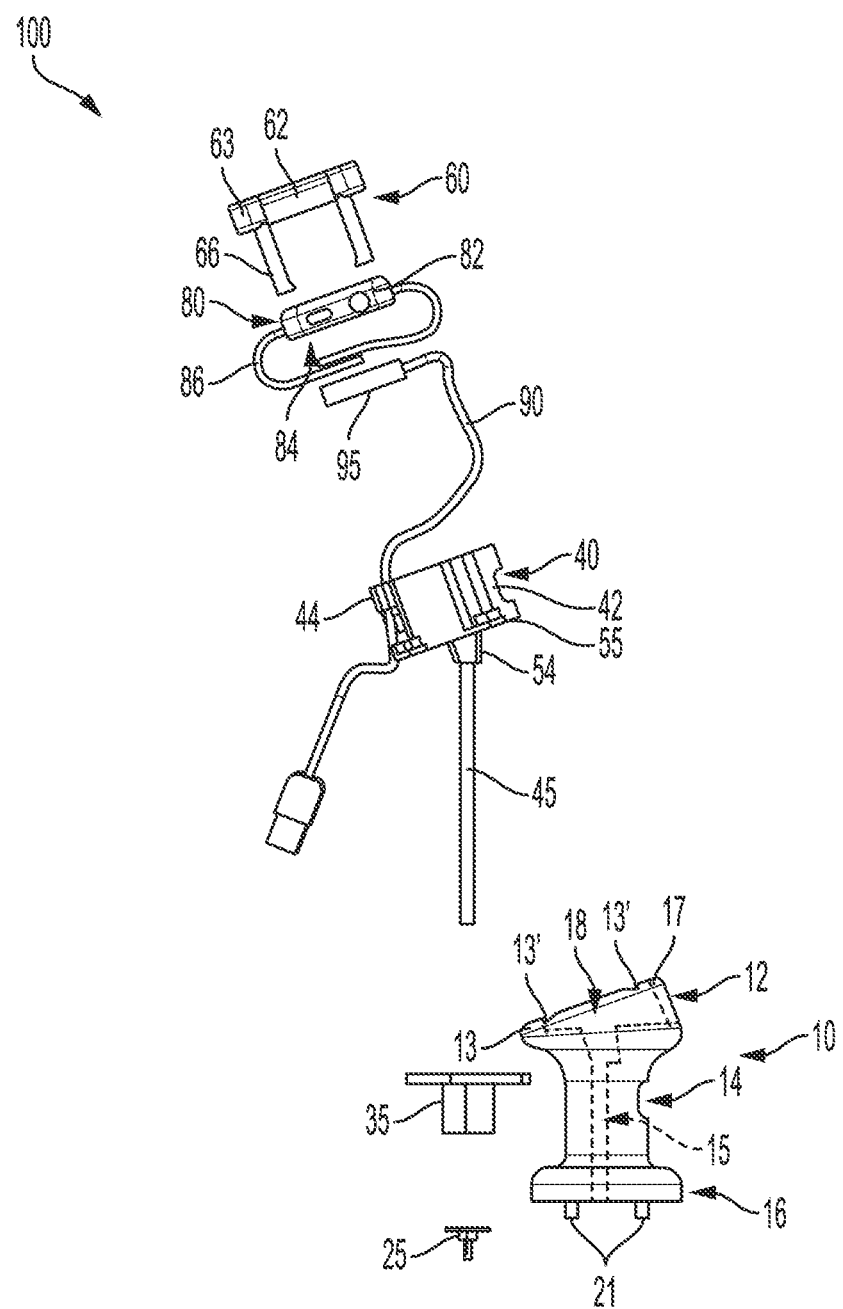
FIG. 3 illustrates and exploded view of an embodiment of the tool-less security apparatus.
Figure 4:
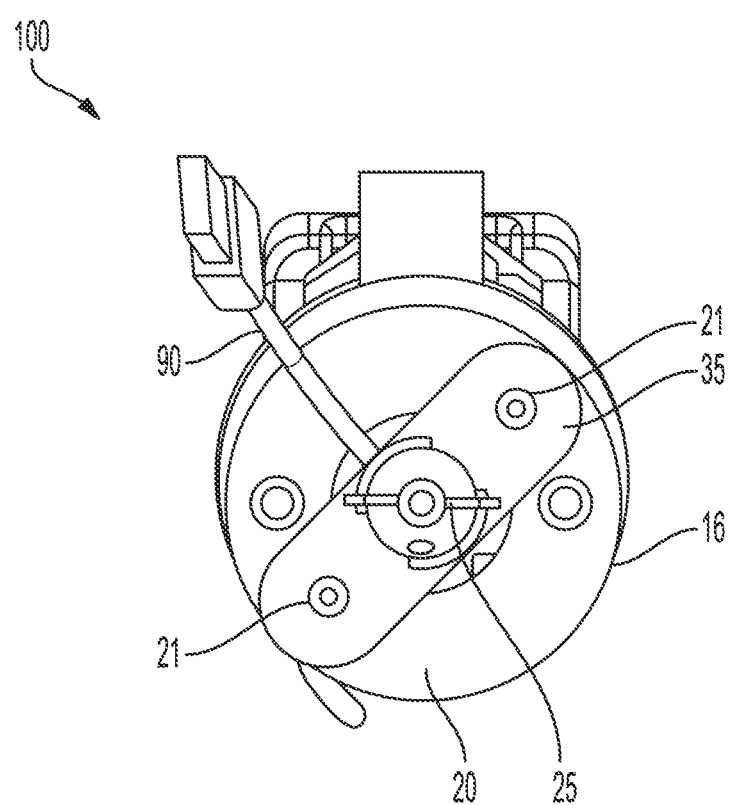
FIG. 4 illustrates a bottom plan view of the embodiment of the tool-less security apparatus of FIG. 1.
Figure 5:
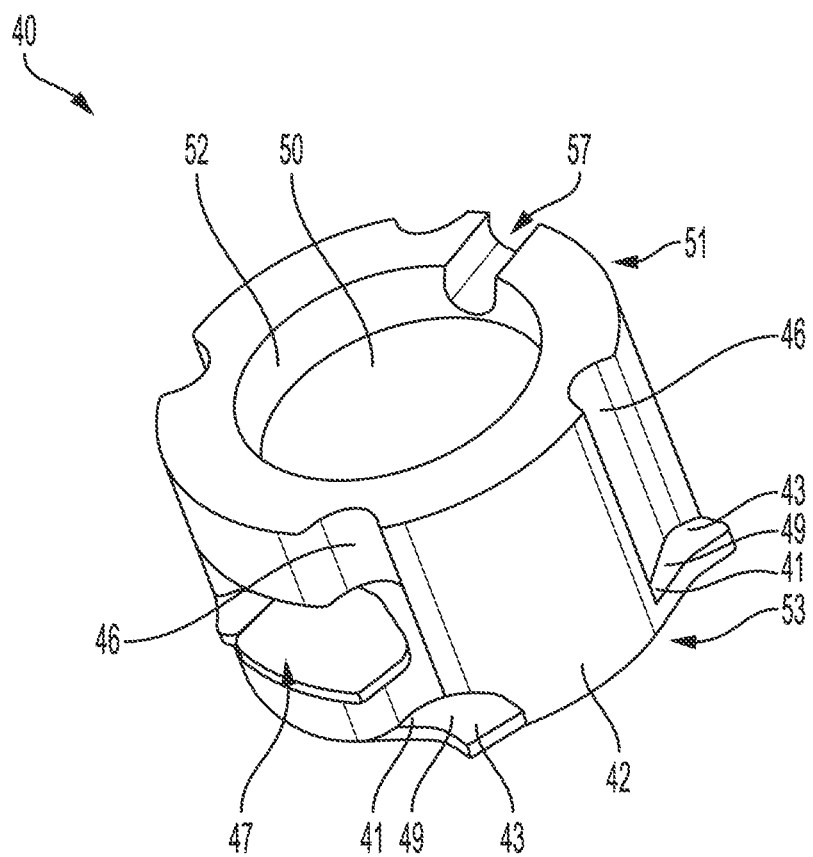
FIG. 5 illustrates a top perspective view of an embodiment of a holder of the tool-less security apparatus; of FIG. 1

FIGS. 1-3 illustrate an embodiment of a tool-less security apparatus 100 ("security apparatus") for a portable electronic device such as a watch or smart watch. The security apparatus 100 generally comprises a base 10 configured to couple to a display surface D, a holder 40 configured to be at least partially accepted by a portion of the base 10, and a securing portion 60 configured to engage with and releasably couple to the holder 40 to secure a portable electronic device 80 between the holder 40 and the securing portion 60.

Still referring to the embodiments shown in FIGS. 1-3, the base 10 generally comprises a holder engagement portion 12 and an anchoring portion 16. As shown, the holder engagement portion 12 may be coupled to the anchoring portion 16 by a base extension or extension 14, however in other embodiments, the holder engagement portion 12 may be directly coupled to the anchoring portion 16. The holder engagement portion comprises an upper rim 13 and an inner surface 17 that defines an inner chamber 18 shown in phantom (FIG. 3). In the embodiments shown, the holder engagement portion 12 has a circular cross section along line A-A (FIG. 1). The upper rim 13 may further comprise a circular shape and may define one or more indents, notches or other surface features 13'. The surface features 13' may extend into the inner chamber 18.

The anchoring portion 16 is positioned at an opposite end of the base 10 than the holder engagement portion 12. As shown in FIGS. 1-4, the anchoring portion 16 may comprise a circular cross section along line B-B. The anchoring portion 16 comprises a bottom surface 20 and one or more anchors 21 extending from the bottom surface 20. The anchors 21 mat be threaded studs, pins, bolts, or any other suitable means of removeably fastening the base 10 to a display surface D. An extension 14 may extend between and couple the holder engagement portion 12 to the anchoring portion 16. As shown in the embodiments of FIGS. 1-3, the extension 14 may have a circular cross section along line C-C (FIG. 1). The base defines a central shaft 15 shown in phantom in FIG. 3. The central shaft 15 extends from the bottom surface 20 of the anchoring portion 16 to the inner chamber 18 of the holder engagement portion 12.

Turning now to FIGS. 1-3 and 5, the holder 40 comprises an inner surface 52 that defines a depression 50 or recess at a first end that is configured to accept a wireless charger 95. One or more passages 57 or openings may be radially from the depression 50 and be configured to accept one or more cords or wires 90 such as a cord to couple the wireless charger 95 to a power source. The holder 40 includes an outer surface 42 with a plurality of vertical grooves 46 that extend between the first end 51 and an opposing second end 53 of the holder 40. Each of the vertical grooves 46 is open at the first end 51 and terminates at or proximate the second end 53 with a support surface 43. As shown, the support surface 43 is generally planar and extends from the holder 40 at an angle relative to a corresponding vertical groove 46 of approximately 90°. The support surface 43 extends laterally from the termination of the groove 46 and forms a support platform 49. A channel 41 is defined between the support platform 49 and the outer surface 42 of the holder 40. Referring to FIG. 3, an anchoring mast 45 or extension may extend from a bottom surface 55 of the holder 40. In the embodiment shown, the anchoring mast 45 projects from a seat 54 that extends from the bottom surface 55 of the holder 40. The anchoring mast 45 may comprise a threaded rod or bolt. The outer surface 42 may comprise one or more holding elements 44, catches, or fastening members configured to hold and otherwise guide the one or more cords 90. As shown, the outer surface 42 of the holder 40 generally comprises a cylindrical shape in the embodiments shown, however in other embodiments, the outer surface 42 of the holder 40 may comprise one or more planar sides and generally comprise a polygonal shape.

Figure 6:
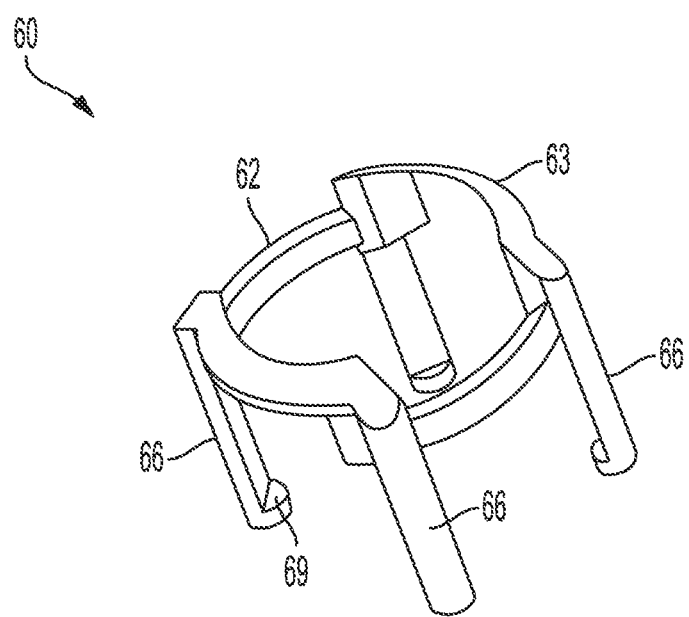
FIG. 6 illustrates a top perspective view of an embodiment of a securing portion of the tool-less security apparatus of FIG. 1.

Referring to FIGS. 3 and 6, the securing portion 60 comprises a plurality of projections or legs 66 that are coupled to each other at a top end by one or more lateral braces 62, 63. As shown, the lateral braces 62, 63 bay be curved such that they form a circular shape. The opposing bottom end of each of the legs 66 comprises a securing surface 69 or foot that extends inwards and towards a center point of the circular shape formed by the lateral braces 62, 63. As shown, the securing portion 60 includes four (4) legs 66, first lateral supports 62 are configured to couple pairs of legs 66. The second lateral braces 63 are configured to extend between and couple to each of the first lateral braces 62. In an embodiment, securing portions 60 may be interchanged between different bases 10 and security portions 60 having different configurations may be used with the same base 10.

Assembly of the security apparatus 100 will next be explained as it relates to secure display of a smart watch, however other portable electronic devices may also be secured in a similar manner with the disclosed security apparatus 100. In order to assemble the security apparatus 100, a smart watch 80 is placed on the holder 40 such that the bottom surface 84 of the watch 80 contacts the wireless charger 95. Each end of the band 86 of the watch 80 is brought over the upper rim 13 and through the holder opening 47. The band can be clasped together at a point under the wireless charger 95. The securing portion 60 is then placed over the holder 40 such that each foot 69 is seated within a vertical groove 46. The securing portion 60 is engaged with the holder 40 and pressed down or inserted onto the holder 40 until each foot 69 contacts the support surface 43 of the holder 40. The securing portion 60 is then rotated with respect to the holder 40 such that each foot 69 is positioned within the channel 41 and positioned proximate or on contact with the support platform 49. The holder 40 and the securing portion 60 are now coupled together.

The holder 40 and securing portion 60 holding the smart watch 80 are inserted into the holder engagement portion 12 of the base 10 such that the seat 54 and seat is positioned within the inner chamber 18 and the securing mast is positioned within the central shaft 15 and protrudes from the bottom surface 20 of the base 10. Each of the support platforms 49 of the holder 40 is positioned in a corresponding notch 13' of the upper rim 13. Once the support platforms 49 are seated within the notches 13', rotation of the securing portion 60 with respect to the holder 40 is not possible. The security apparatus 100 is placed onto a display surface D such that the protruding end of the securing mast 45 traverses the display surface D. Each of the anchors 21 is also configured to traverse the display surface D. A securing member 35, such as a magnet or spacer is configured to engage the anchors 21 and the securing mast 45. An anchoring member or fastener 25 such as a wing nut is attached to the end of the securing mast 45 and tightened to secure the securing member 35 between the fastener 25 and the underside of the display surface D. In an embodiment, a spacer (not shown) may be positioned between the engagement member 35 and the bottom surface 20 of the base 10 or the bottom of the display surface D. Tightening the fastener 25 prevents the security apparatus 100 from being removed from the display surface D and prevents the holder 40 and securing portion 60 from being removed from the base 10. Locking the holder 40 and securing portion 60 into the holder engagement portion 12 of the base 10 prevents separation of the holder 40 from the securing portion 60 by preventing rotation of the securing portion 60 relative to the holder 40.

In this manner, the smart watch 80 is retained within the security apparatus 100 such that the face 82 or display of the smart watch 80 is visible between the lateral braces 62, 63. As shown in FIG. 1, the base extension 14, the anchor portion 16 and a portion of the holder engagement portion 12 extend along and axis L and a portion of the holder engagement portion 12, the holder 40 and the securing portion 60 extend along another axis H that intersects axis L. In order to remove the smart watch 80 from the security apparatus 100, the security apparatus 100 must be uncoupled from the display surface D. The fastener 25 is loosened and removed from the securing mast 45 after which the holder 40 and the securing portion 60 may be removed from the holder engagement portion 12 of the base 10. Rotation of the charging securing portion 60 relative to the holder 40 moves the feet 69 of the securing portion 60 from the channel 49 into a corresponding vertical groove 46. The securing portion 60 may then be pulled away from the holder 40 by pulling the legs 66 along the vertical grooves 46 and away from the first ends 51 of the vertical grooves 46. The watch 80 may then be removed from the security apparatus 100.

In an embodiment, the security apparatus 100 may be equipped with one or more alarm triggers. A trigger may be positioned within the recess 50 of the holder 40 and configured to be depressed by the smart watch 80 when it is being held in the security apparatus. Depression of the trigger prevents the alarm from being tripped, such that removal of the smart watch from the holder 40 trips the alarm. One or more other triggers may be present on other parts of the security apparatus 100, such as the bottom surface 20 of the anchor portion 16 of the base 10. Another alarm may be present that notifies when the cord 90 is decoupled from the power source and/or from the wireless charger 95. The alarm may be auditory and/or visual.

One or more components of the security apparatus 100 may be comprised of one or more types of metal, such as steel, nickel or aluminum, or one or more types of plastic, such as PA6 (Nylon 6), ABS (Acrylonitrile butadiene styrene), or POM (Polyoxymethylene). In an embodiment, one or more components of the security apparatus 100 may be comprised of a combination of metallic and plastic components.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus configured to securely display a portable electronic device, the security apparatus comprising:
   a base defining a central bore and comprising,
      a circumferential rim including a plurality of surface features, and
      one or more anchors extending from a bottom surface of the base
   a holder comprising;
      an outer surface defining a plurality of vertical channels terminating in a support surface, the support surface extending from each of the plurality of vertical channels to a support platform, wherein a holder groove is defined between the support platform and the outer surface of the holder, and
      an inner surface defining a depression, and
      an extension extending from the holder and configured to be partially positioned within the central bore; and
   a securing portion comprising a plurality of projections coupled to each other by one or more lateral braces, wherein each of the plurality of projections comprises a lateral extension that is configured to contact the support surface and engage the holder groove,
   wherein rotation of the securing portion relative to the holder moves each lateral extension of the plurality of projections into the holder groove and secures the securing portion to the holder, wherein each support platform is configured to be positioned within one of the plurality of the surface features of the circumferential rim, and wherein the circumferential rim prevents the securing portion from being rotated relative to the holder.

2. The security apparatus of claim 1, further comprising a wireless charging device configured to be positioned within the depression.

3. The security apparatus of claim 1, wherein the holder defines one or more side openings.

4. The security apparatus of claim 1, further comprising an alarm device configured to generate an alarm signal when a portable electronic device is removed from the holder.

5. The security apparatus of claim 1, wherein the support surface is positioned at about 90° relative to the outer surface of the holder.

6. A security apparatus configured to securely display a portable electronic device, the security apparatus comprising:
   a base defining a central bore and comprising,
      a holder engagement portion, and
      one or more anchors extending from a bottom surface of the base
   a holder comprising,
      an outer surface defining a plurality of vertical channels terminating in a support surface, the support surface extending from each of the plurality of vertical channels to a support platform, wherein a holder groove is defined between the support platform and the outer surface of the holder, and
      an inner surface defining a depression, and
      an extension extending from the holder and configured to be partially positioned within the central bore; and
   a securing portion comprising a plurality of projections coupled to each other by one or more lateral braces, wherein each of the plurality of projections comprises a lateral extension that is configured to contact the support surface and engage a holder groove,
   wherein rotation of the securing portion relative to the holder moves each lateral extension of the plurality of projections into the holder groove and secures the securing portion to the holder.

7. The security apparatus of claim 6, wherein each support platform is configured to accept a portion of a projection of the securing portion.

8. The security apparatus of claim 1, wherein the circumferential rim prevents the securing portion from being rotated relative to the holder.

9. The security apparatus of claim 6, further comprising a wireless charging device configured to be positioned within the depression.

10. The security apparatus of claim 8, wherein the holder defines one or more side openings.

11. The security apparatus of claim 8, further comprising an alarm device configured to generate an alarm signal when a portable electronic device is removed from the holder.

12. The security apparatus of claim 6, wherein the support surface is positioned at about 90° relative to the outer surface of the holder.

\* \* \* \* \*